United States Patent
Prahlad et al.

(10) Patent No.: US 10,007,499 B2
(45) Date of Patent: *Jun. 26, 2018

(54) DECOUPLED INSTALLATION OF DATA MANAGEMENT SYSTEMS

(71) Applicant: CommVault Systems, Inc., Tinton Falls, NJ (US)

(72) Inventors: Anand Prahlad, Bangalore (IN); Parag Gokhale, Marlboro, NJ (US); Srinivas Kavuri, San Jose, CA (US); Christopher A. Alonzo, Seymour, CT (US)

(73) Assignee: COMMVAULT SYSTEMS, INC., Tinton Falls, NJ (US)

( * ) Notice: Subject to any disclaimer, the term of this patent is extended or adjusted under 35 U.S.C. 154(b) by 400 days.

This patent is subject to a terminal disclaimer.

(21) Appl. No.: 14/568,016

(22) Filed: Dec. 11, 2014

(65) Prior Publication Data

US 2015/0169308 A1 Jun. 18, 2015

Related U.S. Application Data

(63) Continuation of application No. 12/628,890, filed on Dec. 1, 2009, now Pat. No. 8,943,183.

(Continued)

(51) Int. Cl.
*G06F 15/173* (2006.01)
*G06F 8/61* (2018.01)
*G06F 9/445* (2018.01)

(52) U.S. Cl.
CPC ............ *G06F 8/61* (2013.01); *G06F 9/44505* (2013.01)

(58) Field of Classification Search
CPC ................................. G06F 8/61; G06F 9/44505

(Continued)

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

AU 2004227949 10/2004
CA 2498174 3/2004
(Continued)

OTHER PUBLICATIONS

Arneson, "Mass Storage Archiving in Network Environments" IEEE, 1998, pp. 45-50.

(Continued)

*Primary Examiner* — Scott B Christensen
(74) *Attorney, Agent, or Firm* — Knobbe, Martens, Olson & Bear LLP

(57) ABSTRACT

Systems and methods for providing decoupled installation of data management systems used in conjunction with computer networks are disclosed. The method comprises installing data storage software in order to facilitate communication with a second computer in order to perform data storage operations. The software may be installed without knowledge of the second computer and/or the ability to communicate with the second computer. During the installation process, configuration parameters are obtained by the first computer and stored in a data structure. At least a portion of the configuration parameters recorded in the data structure is also provided to the second computer. The first and second computers subsequently communicate in order to register the first computer for use with the second computer.

16 Claims, 3 Drawing Sheets

Related U.S. Application Data

(60) Provisional application No. 61/121,456, filed on Dec. 10, 2008.

(58) Field of Classification Search
USPC .......................................................... 709/221
See application file for complete search history.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran | |
| 7,500,053 B1 | 3/2009 | Kavuri et al. | |
| 7,536,291 B1 | 5/2009 | Retnamma et al. | |
| 7,543,125 B2 | 6/2009 | Gokhale | |
| 7,546,324 B2 | 6/2009 | Prahlad et al. | |
| 7,577,722 B1 * | 8/2009 | Khandekar | G06F 9/45558 |
| | | | 709/220 |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,019,872 B2 | 9/2011 | Lora et al. | |
| 8,943,183 B2 | 1/2015 | Prahlad et al. | |
| 9,609,058 B2 | 3/2017 | Vallabhaneni et al. | |
| 9,710,253 B2 | 7/2017 | Bansod | |
| 9,800,656 B2 | 10/2017 | Vallabhaneni et al. | |
| 2003/0200201 A1 | 10/2003 | Milius | |
| 2005/0039051 A1 * | 2/2005 | Erofeev | H04L 63/029 |
| | | | 726/4 |
| 2005/0177617 A1 * | 8/2005 | Banginwar | H04L 69/329 |
| | | | 709/203 |
| 2006/0053261 A1 * | 3/2006 | Prahlad | G06F 3/0605 |
| | | | 711/162 |
| 2006/0053263 A1 | 3/2006 | Prahlad et al. | |
| 2009/0024993 A1 | 1/2009 | Reus et al. | |
| 2009/0089781 A1 | 4/2009 | Shingai et al. | |
| 2009/0144700 A1 * | 6/2009 | Huff | G06F 9/44505 |
| | | | 717/121 |
| 2010/0131084 A1 | 5/2010 | Van Camp | |
| 2011/0138374 A1 | 6/2011 | Pal | |
| 2012/0054728 A1 | 3/2012 | Rohde et al. | |
| 2013/0275695 A1 | 10/2013 | Ponsford et al. | |
| 2015/0178063 A1 | 6/2015 | Narkinsky et al. | |
| 2016/0103671 A1 | 4/2016 | Curran et al. | |
| 2016/0306618 A1 | 10/2016 | Bansod | |
| 2017/0269924 A1 | 9/2017 | Bansod | |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0645709 | 3/1995 |
| EP | 0774715 | 5/1997 |
| EP | 0809184 | 11/1997 |
| EP | 0899662 | 3/1999 |
| EP | 0981090 | 2/2000 |
| EP | 1204922 | 5/2002 |
| EP | 1384135 | 1/2004 |
| EP | 1393181 | 3/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogenous Environments", IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Mendel Rosenblum Operating Systems Review (SIGOPS), vol. 25, No. 5, May 1991, New York, US, "The Design and Implementation of a Log-Structured File System", p. 4, paragraph 3.3-p. 5.

(56) References Cited

OTHER PUBLICATIONS

Prahlad et al., U.S. Appl. No. 12/628,890, filed Dec. 1, 2007, Decoupled Installation of Data Management Systems, U.S. Pat. No. 8,943,183.
Brahmaiah et al., U.S. Appl. No. 14/513,049, filed Oct. 13, 2014, Storage Management Operations Based on Executable Files Served on Demand to Storage Management Components, U.S. Pat. No. 9,609,058.
Brahmaiah, U.S. Appl. No. 15/413,249, filed Jan. 23, 2017, Storage Management Operations Based on Executable Files Served on Demand to Storage Management Components.
Bansod, U.S. Appl. No. 14/742,566, filed Jun. 17, 2015, Managing a Software-Patch Submission Queue, Published As 2016/0306618.
Prahlad, et al., U.S. Appl. No. 12/628,890 Now U.S. Pat. No. 8,943,183, filed Dec. 1, 2009, Decoupled Installation of Data Management Systems.
Vallabhaneni et al., U.S. Appl. No. 14/513,049 Now U.S. Pat. No. 9,609,058, filed Oct. 13, 2014, Storage Management Operations Based on Executable Files Served on Demand to Storage Management Components.
Vallabhaneni et al., U.S. Appl. No. 15/413,249 Now U.S. Pat. N. 9,800,656, filed Jan. 23, 2017, Storage Management Operations Based on Executable Files Served on Demand to Storage Management Components.
Vallabhaneni et al., U.S. Appl. No. 15/671,011, filed Aug. 7, 2017, Storage Management Operations Based on Executable Files Served on Demand to Storage Management Components.
Bansod, U.S. Appl. No. 14/742,566 Now U.S. Pat. No. 9,7190,253, filed Jun. 17, 2015, Managing a Software-Patch Submission Queue.
Bansod, U.S. Appl. No. 15/617,987 Published as 2017/0269924, filed Jun. 8, 2017, Managaing a Software-Patch Submission Queue.
Chan, "Essentials of Patch Management Policy and Practices", PatchManagement.org, Jan. 31, 2004, pp. 1-5.

* cited by examiner

DECOUPLED INSTALLATION OF DATA MANAGEMENT SYSTEMS

RELATED APPLICATION

Any and all priority claims identified in the Application Data Sheet, or any correction thereto, are hereby incorporated by reference under 37 CFR 1.57.

BACKGROUND

Field of the Invention

Embodiments of the invention relate to systems and methods for installing software in data management systems and, in particular, in data storage systems.

Description of the Related Art

Data management systems are routinely utilized in computer networks to perform data storage and other operations on electronic data stored within the network. In general, primary data, comprising a production copy or other "live" version in a native format used by a first computer, is generally stored in local memory, or another high speed storage device, of the first computer that allows for relatively fast access. Such primary data is generally intended for short term retention, on the order of hours or days. After this retention period, some or all of the data is stored as one or more secondary copies, for example, to prevent loss of data in the event that a problem occurs with the data stored in primary storage. Secondary copies are generally intended for longer-term storage, on the order of weeks to years, prior to being moved to other storage or discarded. Secondary copies may be indexed so that a user may browse and restore the data at a later point in time. In some embodiments, application data moves from more expensive, quick access storage to less expensive, slower access storage over its lifetime. An example of a data migration system which performs data migration operations on electronic data is the QINETIX storage management system by CommVault Systems of Oceanport, N.J.

In order to perform these data storage functions, data storage software is installed on a plurality of first computers. The data storage software on the first computers communicates with at least one second computer which coordinates data storage operations amongst the plurality of first computers in order to ensure the orderly migration of data from short term, primary storage devices to long term, secondary storage.

During the installation process, configuration parameters are communicated between the first computers and the second computers in order to "register" the first computers for use with the second computers. This registration process, in one aspect, establishes that the first computers are authorized to share information with the second computers. In another aspect, the registration process also establishes hardware and software parameters that allow each of the computers to perform data storage operations with each other.

In conventional systems, these configuration parameters are provided to the first and second computers during installation of the data storage software. Conventional installations such as this are problematic, however. In one aspect, the configuration parameters are typically entered in each computer manually. Significant time and effort is required to gather this information and to travel to the location of the first and second machines. This requirement complicates scheduling the installation of the software, as it often requires the availability of a computer professional. In another aspect, this requirement drives up the cost of installing the software, as information technology (IT) professionals are skilled labor whose time is valuable.

In a further aspect, some of the configuration parameters may be unavailable when the data storage software is installed. For example, the installation may require information regarding the second computer which is unknown to the IT professional. Alternatively, last minute changes in the configuration parameters may occur, impeding the software installation until the correct parameters are determined. In each case, the IT professional must expend time and energy obtaining the proper configuration information before the software installation may be completed. These problems, as well as those described above, are further magnified as the number of first machines upon which software is to be installed increases.

SUMMARY

The above-described deficiencies in the installation of software, particularly data storage systems, illustrate the need for improved systems and methods for software installation.

In certain embodiments, a method of decoupled software installation for a first computer which communicates with a second computer that coordinates data storage operations with the first computer is provided. The method comprises installing data storage software on the first computer. A plurality of first computer configuration parameters are discovered by the first computer during software installation and the second computer does not communicate with the first computer during the software installation. The method further comprises recording at least a portion of the first computer configuration parameters within a data structure. The method additionally comprises communicating at least a portion of the first computer configuration parameters to the second computer. The method also comprises comparing first computer configuration parameters stored by the first and second machines.

In certain embodiments, a method of deploying a first computer for use with a second computer within a data storage system is provided. The method comprises recording a plurality of first computer configuration parameters within a data structure. The method further comprises transmitting at least a portion of the data structure to each of the first and second computers such that, upon receiving the data structure, at least one of the first and second computers possesses sufficient information so as to communicate with the other. The method also comprises configuring at least one of the first and second computers to automatically discover the other machine after transmission of the data structure. The method additionally comprises comparing the first computer configuration parameters stored by the first and second computers.

In further embodiments, a system for decoupled installation of data storage software is provided. The system comprises a first computer possessing installed data storage software, a second computer, wherein the first computer does not substantially communicate with the server computer during the software installation, and a data structure containing a plurality of first computer configuration parameters which are necessary for communication between the first and the second computers. At least a portion of the first computer configuration parameters are provided to the second computer and wherein the first and second computers communicate after software installation in order to register the first computer for use in performing data storage operations with the second computer.

BRIEF DESCRIPTION OF THE DRAWINGS

These and other objects and advantages will become more apparent from the following description taken in conjunction with the accompanying drawings.

DETAILED DESCRIPTION OF THE PREFERRED EMBODIMENTS

Embodiments of the invention relate to systems and methods for decoupled installation of software on a first computer which communicates with a second computer for purposes which may include, but are not limited to, licensing, control, and data. In one embodiment, the first and second machines may comprise computers. In general, the data migration software is configured such that it may be installed on the first computer without communication with the second machine during the installation process. Advantageously, as discussed below, the decoupled installation ability provides IT professionals with significant flexibility in the deployment of the software, reducing the time and cost to install the data storage software.

Embodiments of the invention are discussed below in the context of data storage software for use in performing selected data storage operations within a data storage system. However, it may be understood that the embodiments may be utilized in conjunction with any software product which communicates with a computer for the purposes of licensing, control, or data.

In one embodiment, data storage systems include combinations of hardware, software, and firmware programs, as well communications links, necessary for performing data storage operations on electronic data within a computer network. Embodiments of data storage systems are disclosed in U.S. Provisional Patent No. 60/567,178, filed Apr. 30, 2004 and U.S. Pat. No. 7,343,453, issued Mar. 11, 2008, each of which is incorporated herein by reference in its entirety.

Figure 1:
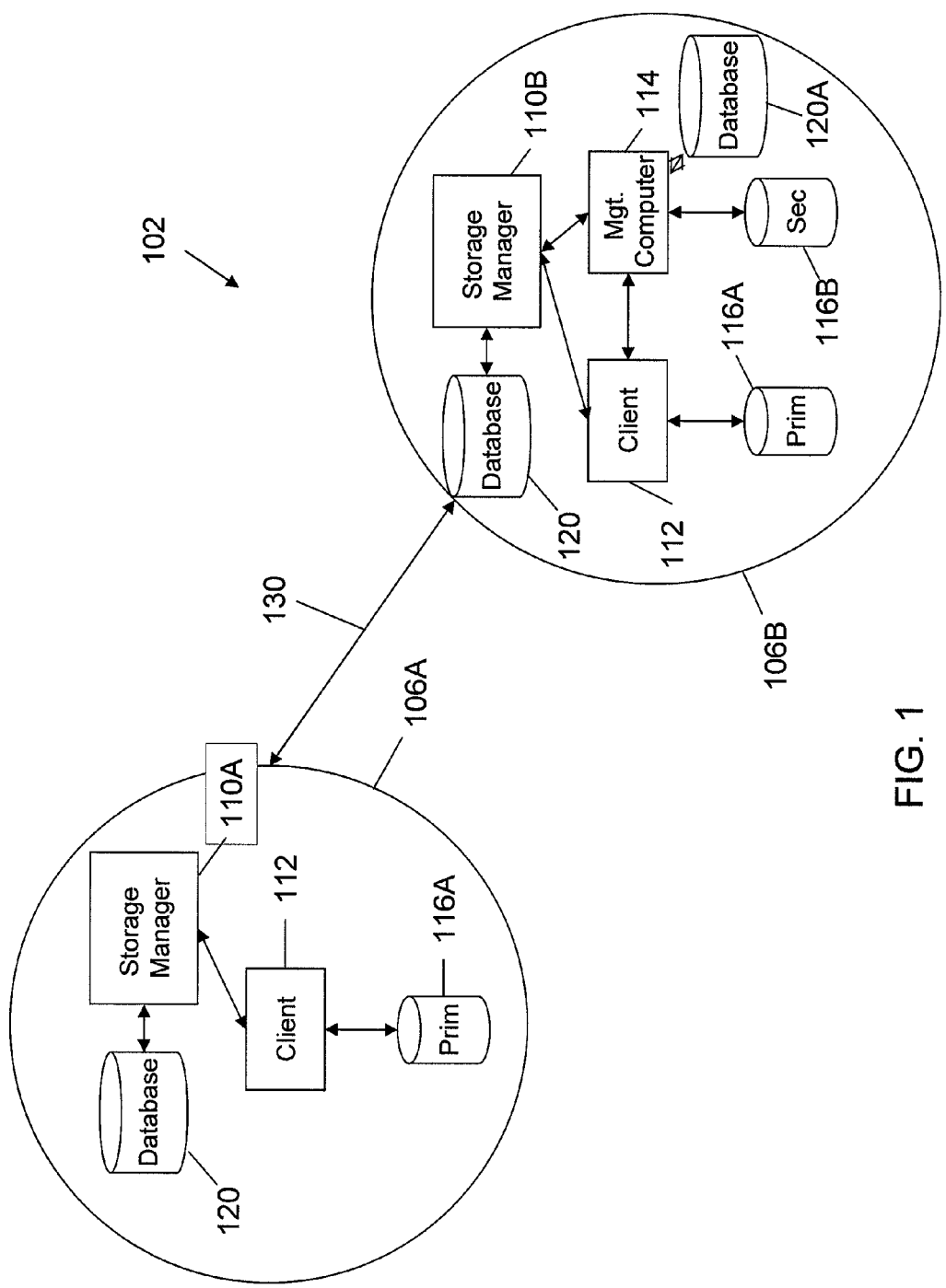
FIG. 1 is a schematic illustration of one embodiment of a data storage system whose software is installed through decoupled installation.

FIG. 1 illustrates one embodiment of a data storage system 102 for use in conjunction with a computer network. In one embodiment, the system 102 comprises a plurality of storage operation cells 106A, 106B which communicate through communication links 130. The storage operation cells 106A, 106B may include combinations of hardware, software, and firmware elements associated with performing data storage operations on electronic data, including, but not limited to, creating, storing, retrieving, and migrating primary data copies and secondary data copies. One exemplary storage operation cell 106A, 106B may comprise COMMCELLS, as embodied in the QNET storage management system and the QINETIX storage management system by CommVault Systems of Oceanport, N.J.

In one embodiment, the storage operation cells 106A, 106B may comprise combinations of elements such as storage managers 110A, 110B, client computers 112, management components 114, and primary and secondary storage devices 116A, 116B, as discussed in greater detail below. It may be understood that this list is not exhaustive and that the number of these and other elements present or absent within the cells 106A, 106B may be provided as necessary for performance of data storage operations by the cells 106A, 106B. In some embodiments, certain elements reside and execute on the same computer, while in alternate embodiments, the some or all of the elements reside and execute on different computers.

In general, decoupled software installation allows the storage management software to be installed on first machines, such as the client computers 112 and management components 114, without communication with a second machine, such as the storage managers 110A, 110B. In the discussion below, the first machine upon which the software is installed may be referred to as the client computer 112; however, the first computer may comprise client computers 112, management components 114, or combinations thereof. Furthermore, the second computer may be referred to as the storage manager 110A, 110B or server below; however, the second computer may comprise any device which coordinates data storage operations amongst the plurality of first computers in order to ensure the orderly migration of data from short term, primary storage devices to long term, secondary storage.

In certain embodiments, discussed in greater detail below, the data storage software may be installed on the client computer 112 without knowledge regarding the storage manager 110A, 110B and/or the ability to communicate with the storage manager 110A, 110B. In one embodiment, when the data storage software is installed, the configuration parameters of the client computer 112 are provided to the client computer 112 in a data structure. For example, the data structure may be provided, at least in part, by the software installation, discovered by the client computer 112 through an auto-discovery process, provided by an external source, or combinations thereof. In one embodiment, after the data storage software is installed, the storage manager 110A, 110B may read at least a portion of the configuration parameters from the data structure from the client computer 112 or be provided with the configuration parameters from a source which is not the client computer 112. Subsequently, the storage manager 110A, 110B may communicate with the client computer 112 to register the client computer 112 to work with the storage manager 110A, 110B to perform data storage operations.

Advantageously, this software design significantly reduces the time required to deploy the data storage system. In one example, by configuring the data migration software to automatically discover and/or receive pre-generated configuration parameters, the decoupled installation significantly automates the installation process, while still providing for the customization of the configuration parameters necessary for proper operation of the data migration software. In further examples, by configuring at least one of the first and second computers to initiate contact with the other upon installation of the software, further configuration parameters of the first and second computers may be automatically discovered, updated, and verified, with little to no human intervention. These and other objects and advantages of the disclosed embodiments are discussed in greater detail below.

The storage managers 110A, 110B comprise computers configured with a software module or other application which coordinates and controls storage operations performed by the storage operation cells such as cells 106A, 106B. These operations may include, but are not limited to, initiation and management of production data copies, production data migrations, production data recovery, and backup operations. To perform these operations, the storage managers 110A, 110B may communicate with some or all elements of the storage operation cells 106A, 106B. The storage managers 110A, 110B may also maintain a database 120 or other data structure to indicate logical associations between elements of the cells 106A, 106B, for example, the logical associations between management components 114 and storage devices 116A, 116B as discussed below.

In one embodiment, the management component 114 is an element that provides instructions to a plurality of associated storage devices, such as devices 116A, 116B, to perform storage operations which subsequently archive, migrate, or restore data to or from the storage devices 116A, 116B as directed by the storage managers 110A, 110B. For example, the management component 114 may be implemented as a software module that conveys data, as directed by the storage manager 110, between a first machine, such as client computer 112, and one or more storage devices 116A, 116B, such as a tape library, a magnetic media storage device, an optical media storage device, or other suitable storage device. In one embodiment, management components 114 may be communicatively coupled with, and control, a plurality of storage devices 116A, 116B associated with that particular management component 114. A management component 114 may be considered to be associated with a particular storage device 116A, 116B if that management component 114 is capable of routing and storing data to that storage device.

In one example, in operation, the management component 114 associated with particular storage devices 116A, 116B, may instruct the storage devices 116A, 116B to use a robotic arm or other retrieval mechanism to load or eject certain storage media, and to subsequently archive, migrate, or restore data to or from that media. Management components 114 may communicate with a storage device 116A, 116B via a suitable communications link 130, such as SCSI, fiber channel, LAN, WAN, SAN, or other communication methods known in the art.

The management component 114 may also maintain an index cache, database, or other data structure 120A which stores index data generated during data storage, restoration and other data storage operations that may generate index data. The data structure 120A provides the management component 114 with a fast and efficient mechanism for performing any combination of locating, tracking, and processing data stored or archived. Thus, in some embodiments, the storage manager database 120 may store data associating a client 112, with a particular management component 114 or storage device 116A, 116B while database 120A associated with the management component 114 may indicate specifically where client data is stored in the storage device 116, what specific files are stored, and other information associated with the storage of client data. In alternative embodiments, a single storage manager database 120 may perform both of the function of the databases 120, 120A described above.

In one embodiment, a first storage operation cell 106A may be configured to perform a particular type of storage management operation, such as storage resource management operations (SRM). SRM may comprise operations include monitoring the health, status, and other information associated with primary copies of data (e.g. live or production line copies). Thus, for example, the storage operation cell 106A may monitor and perform SRM related calculations and operations associated with primary copy data. The first storage operation cell 106A may include the client computer 112 in communication with a primary storage device 116A for storing data directed by the storage manager 110 associated with the cell 106A.

For example, the client 112 may be directed using Microsoft Exchange data, SQL data, oracle data, or other types of production data used in business applications or other applications stored in the primary volume. The client 112 may contain SRM modules or other logic directed to monitor or otherwise interact with the attributes, characteristics, metrics, and other information associated with the data stored in the primary volume.

In another implementation, a storage operation cell 106B may also contain a management component 114 and secondary storage volume 116B configured to perform SRM-related operations on primary copy data. The storage manager 110 may also track and store information associated with primary copy storage. In some embodiments, the storage manager 110 may also track where primary copy information is stored, for example in secondary storage.

In alternative implementations, the storage operation cell 106B may be directed to another type of data storage operation, such as hierarchical storage management (HSM) data storage operations. For example, the HSM storage cell may perform production data storage, snapshots or other types of HSM-related operations known in the art. For example, in some embodiments, data is migrated from faster and more expensive storage such as magnetic storage (i.e., primary storage) to less expensive storage such as tape storage (i.e., secondary storage).

The storage managers 110A, 110B may further monitor the status of some or all data storage operations previously preformed, currently being performed, or scheduled to be performed by the storage operation cells 106A, 106B, respectively. In one embodiment, the storage managers 110A, 110B may monitor the status of all jobs in the storage cells 106A, 106B under their control as well as the status of each component of the storage operation cells 106A, 106B. The storage manager may monitor operations, such as SRM or HSM operations as discussed above, to track information which may include, but is not limited to: file type distribution, file size distribution, distribution of access/modification time, distribution by owner, capacity and asset reporting (by host, disk, or partition), availability of resources, disks, hosts, and applications. Thus, for example, the storage manager 110 may track the amount of available space, congestion, and other similar characteristics of data associated with the primary and secondary volumes 116A, 116B.

The storage manager 110A of a first storage cell 106A may also communicate with a storage manager 110B of another cell, such as 106B. In one example, a storage manager 110A in a first storage cell 106A communicates with a storage manager 110B in a second cell 106B to control the storage manager 110B of the second cell 106B. Alternatively, the storage manager 110A of the first cell 106A may bypass the storage manager 110B of the second cell 106B and directly control the elements of the second cell 106B.

In further embodiments, the storage operation cells 106A, 106B may be hierarchically organized such that hierarchically superior cells control or pass information hierarchically to subordinate cells and vice versa. For example, FIG. 1 illustrates one example in which storage operation cell 106A is hierarchically superior to cell 106B. In one embodiment, a storage manager 110A of the hierarchically superior cell 106A may be associated with, communicate with, and direct data migration operations for a plurality of storage operation cells, such as cell 106B. In one embodiment, the storage manager 110A may be part of a storage operation cell, such as cell 106A. In alternative embodiments, the storage manager 110A may reside in its own storage operation cell.

In other embodiments, hierarchically superior storage manager 110A may track the status of associated, subordinate storage operation cells 106B, such as the status of jobs, system elements, system resources, and other items by communicating with cell 106B. Moreover, the storage manager 110A may track the status of its associated, subordinate storage operation cells, such as 106B by receiving periodic status updates from the subordinate cells regarding jobs, elements, system resources, and other items. For example, a storage manager 110A may use methods to monitor network resources such as mapping network pathways and topologies to, among other things, physically monitor the data migration operations of its associated, subordinate storage operation cells, 106B.

A hierarchically superior storage manager 110A may further comprise programming or other logic directed toward analyzing the storage patterns and resources of its associated, subordinate storage cells, such as cell 106B. Thus, for example, the storage manager 110A may monitor or otherwise keep track of the amount of resources available, such as storage media, in its subordinate cells 106B. This allows the storage manager 110A to determine when the level of available storage media, such as magnetic or optical media, fall below a selected level, so that an alert may be issued that additional media may be added or removed as necessary to maintain a desired level of service.

Figure 2:
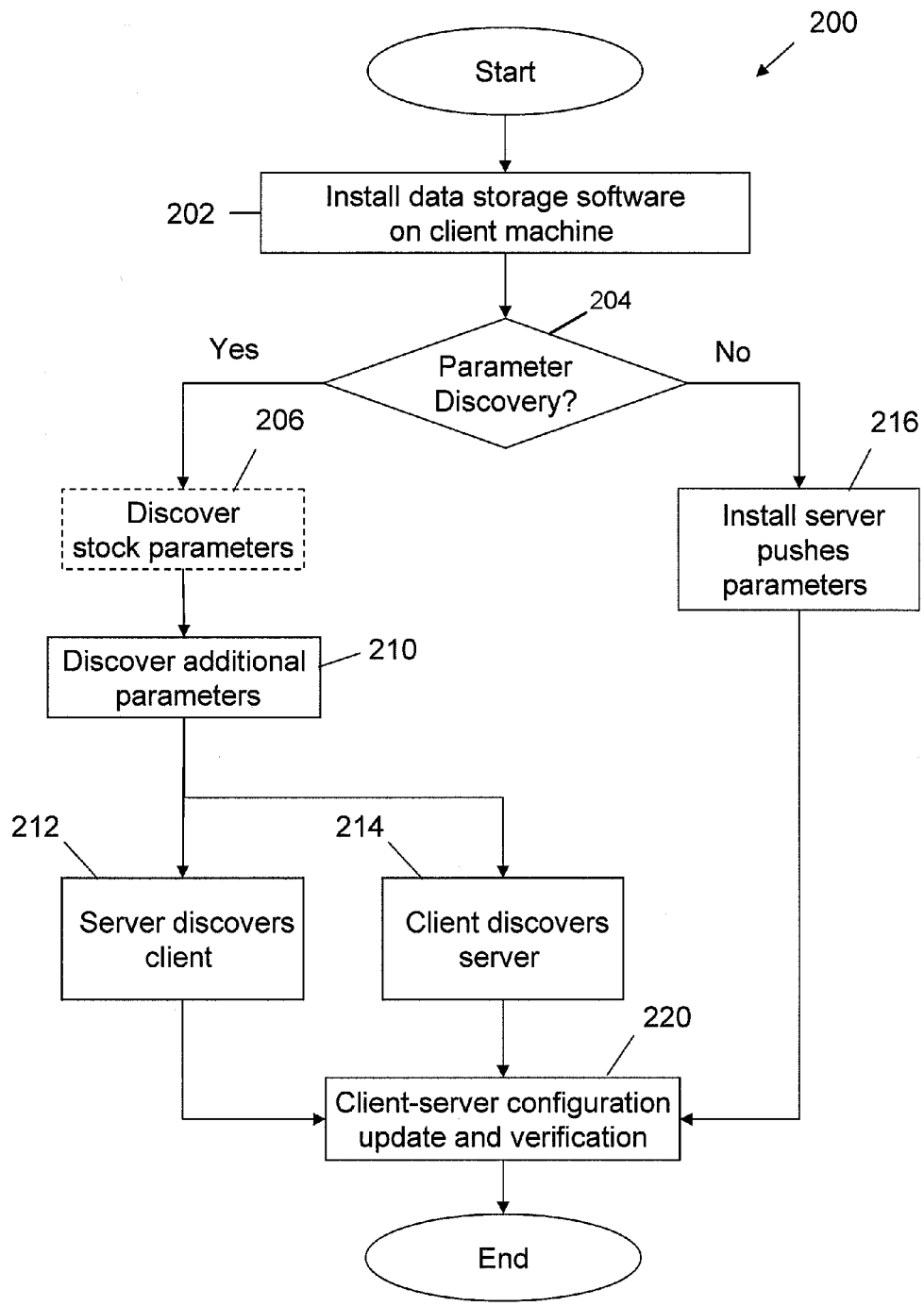
FIG. 2 is a flowchart illustrating one embodiment of a method of decoupled software installation for a data storage system.

FIG. 2 presents a diagram illustrating of one embodiment of a method 200 of decoupled software installation. In step 202 of the method 200, the data storage software is installed on the client machine. In steps 206, 210, and 216 of the method 200, the client configuration parameters needed by the software to communicate with the server are obtained by the client. In steps 212, 214, the client and server discover each another. In step 220, the client and server communicate so as to exchange, update, and verify the other's configuration parameters. While these method steps 202-220 are described sequentially below, it may be understood that certain steps may be performed concurrently or in any order without departing from the spirit of the disclosure.

As illustrated in FIG. 2, the data storage software is installed on the client machine in step 202. In one embodiment, the software installation is conducted according to the manufacturer's instructions. For example, the software may be provided using portable media such as CD-ROMs or DVD. Alternatively, the software may be downloaded from a hard-disk drive or other fixed media that may be local to the client machine or accessed through a network. Such network communication may be performed over wired or wireless communications devices. In further embodiments, an automated installation program may guide the user through the installation process, where operations including, but not limited to, decompression, copying, and system registration of selected files are performed. The installation may be completely automated, without user intervention or may employ user intervention at selected portions of the installation process.

In steps 206, 210, and 216 of the method 200, the data storage software is populated with at least a portion of the configuration parameters required for operation. In one embodiment, the configuration parameters comprise combinations of optional and required parameters for registration of the data storage software installed on the client machine with a second machine, such as a server machine. Registration establishes the authorization of the data storage software to communicate with the server, as well as configures the server to work in conjunction with the data storage software on the client machine.

In certain embodiments, the required information comprises configuration parameters that are necessary for the registration of the data storage software with the server. In contrast, the optional parameters are not necessary for registration. Embodiments of the required and optional configuration parameters are listed below. It may be understood that the parameters described are examples and that these and other parameters may be employed, as necessary, in any combination, added to, or omitted, without departing from the spirit of the disclosure.

Examples of the required parameters comprise one or more of the following: a client display name, a client hostname, a client operating system name, a plurality of client hardware identifiers, such as IA 32 bit, 64 bit, and x64 bit, other software installation management (SIM) information pertaining to the client, such as folder locations, software version, and client time, a plurality of installed platforms on the client (e.g. software applications such as MICROSOFT EXCHANGE, LOTUS NOTES, NOVEL GROUPWISE), and a data storage software installation folder of the client.

Examples of the optional client configuration parameters comprise the client time zone, a job results folder, an index cache folder, a selection of physical or virtual machine (physical machine), a plurality of port numbers, an original equipment manufacturer (OEM) ID, a globally unique identifier (GUID) of the client, a hostname, a storage policy for one or more default subclients, a clock skew, a physical client ID of a virtual machine, and patch cache location. Examples of port numbers may include, but are not limited to, a CommVault Daemon (CVD) port number, and an event manager port number.

The data storage software may obtain the client configuration parameters through a variety of mechanisms, described in greater detail below with respect to FIGS. 2 and 3. In one embodiment, the client configuration parameters may be provided to the client and the server. In other embodiments, the client configuration parameters may be discovered. In further embodiments, the client configuration parameters may comprise a combination of provided and discovered parameters.

In one embodiment, the client may discover the client parameters in steps 206 and 210. As discussed in greater detail below, discovered client parameters may subsequently be stored in an XML file for registration of the client machine with the server.

In one embodiment, a portion of the client configuration parameters comprising "stock" parameters may be discovered, step 206. These stock parameters comprise configuration parameters which do not vary with the local environment in which the client machine operates, and therefore, may be known prior to deployment of the client machine. In one example, a data structure containing the stock parameters may be provided with the data installation files and read in by the client during the installation of the data storage software.

In another embodiment, at least a portion of the remaining client configuration parameters may be discovered in step 210. For example, the data storage software may be configured with an application programming interface (API, FIG. 3, 300) which facilitates auto-discovery of at least a portion of the non-stock client configuration parameters. Examples of these non-stock parameters may include, but are not limited to, digital rights management ("DRM") and network information, such as the client's hardware and IP address.

In further alternative embodiments, the user may be prompted for entry of a registration key during the installation process. As understood in the art, registration keys, in one aspect, provide authorization to install the software. In another aspect, registration keys may allow access to selected features of software. The registration key may be provided by the manufacturer or distributor of the software to purchasers of the software.

In one embodiment, the software may be configured such that entry of a selected registration key provides the user an option to respond to a series of questions regarding the remaining configuration parameters of the client in step 210. The answers provided to the software by a user are recorded in a data structure. In one embodiment, the answers are recorded in an XML file. This process will be referred to herein as "pre-imaging." In certain embodiments, a dialog box may further warn the user that the installation is not completed until the client machine has registered with the server.

In further alternative embodiments, the discovery of stock configuration parameters in step 206 is bypassed. In these embodiments, the method moves directly to step 210, where substantially all of the client configuration parameters are discovered by the client, either automatically or through user entry, as discussed above.

Figure 3:
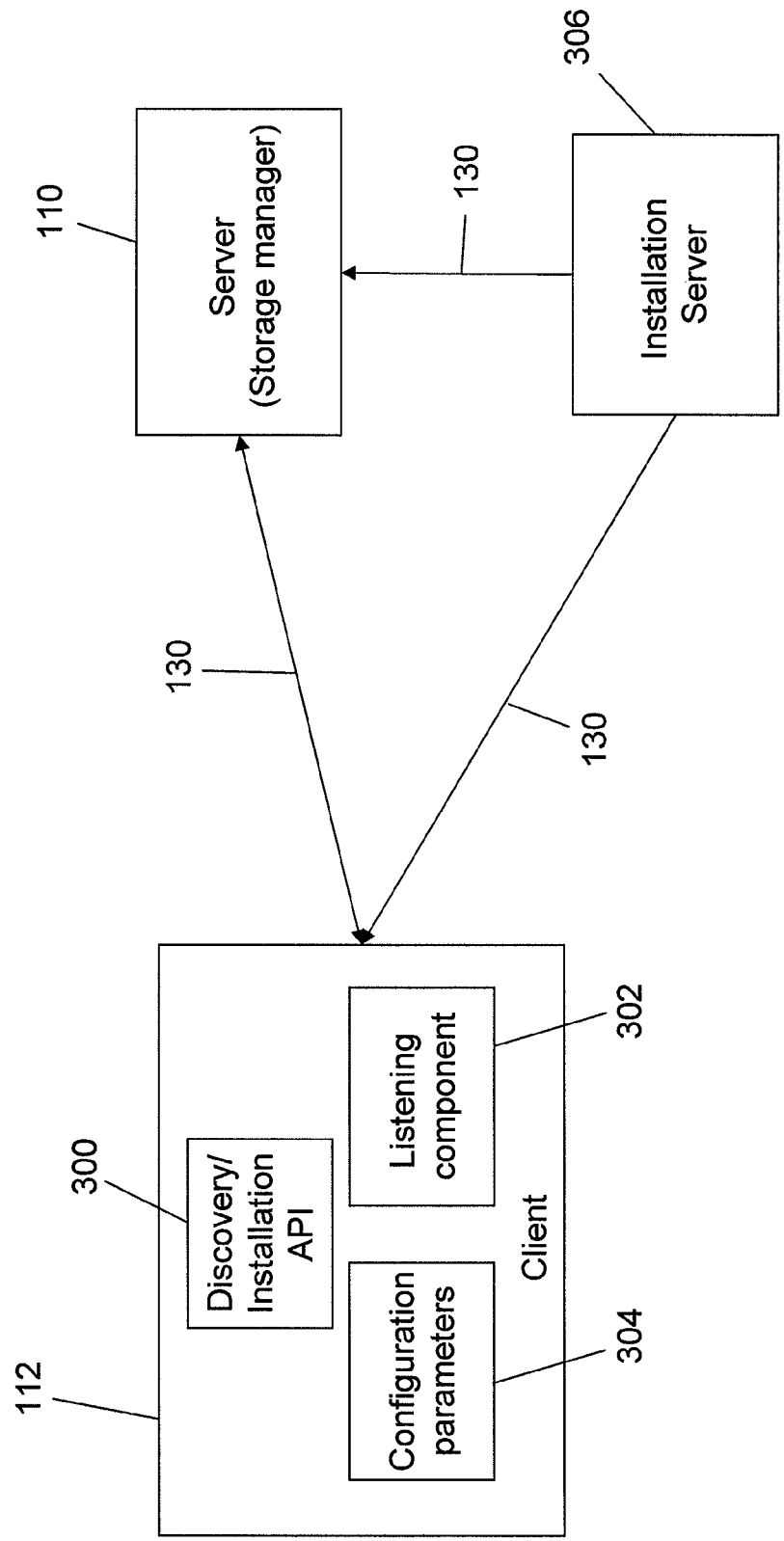
FIG. 3 is a schematic illustration of communication between a first machine upon which data storage software is installed, a second computer which registers the first machine for use with a data storage system, and an installation server which provides a plurality of configuration parameters that facilitates the registration process between the first and second computers.

Once the client is populated with its configuration parameters, the method moves to either of step 212 or 214, where the client and server discover one another (FIG. 3). As discussed below, in one embodiment, the client may discover the server (step 214), while in another embodiment, the server may discover the client (step 212).

In step 212, the server 110 discovers the client 112. In one embodiment, an administrator of the data storage system may employ a user interface of the server 110 to select an option to add a new client machine. In one embodiment, the administrator may be prompted to provide at least one of the client machine name, hostname, and port number in order to allow the server to connect to the client machine. The port is a virtual data connection used by programs to exchange information directly, instead of going through a file or other temporary storage location. For example, the port number may comprise a special number present in the header of a data packet which is used to map data to a particular process running on a computer, such as instances of the data storage software. In the case of the data storage software, the port number corresponds to the port number of the data storage application residing on the client machine. In certain embodiments, where a port number is not provided, a default number may be assumed by the server.

In an alternative embodiment, the client 112 may discover the server 110 in step 214. For example, the software installation may provide the client 112 with one or more listening processes 302 which listen for network traffic indicating that the server 110 is present. Upon verifying that the server 110 is reachable across the network, such as through use of a ping, the client 112 may provide its IP and port information to the server 110 so as to allow client-server communication.

After the IP and port information of the client 112 is provided to the server, the server machine subsequently communicates with the client machine in step 220. The server 110 first contacts the appropriate processes on the client machine 112, as specified by the port number. Upon contacting the processes, the corresponding control set on the client machine 112 is determined, based upon information stored on the client machine during the parameter discovery process. In general, the control set is a set of the configuration data required to start devices and system services. For example, in MICROSOFT WINDOWS SERVER, at least two control sets are maintained in the registry, identified as CurrentControlSet and LastKnownGood control set. The current control set is that most recently used to start the client. Each control set is stored in the Select subkey of the Windows registry. In other embodiments, control sets are maintained in a data object and used by other devices such as servers and network devices.

During communication between the client 112 and server 110, the server 110 further locates the data structure 304 containing the configuration parameters. Upon discovery of the data structure, a copy of the data structure 304, or a selected portion thereof, may be sent back to the server 112. At least a portion of the configuration parameters contained within this data structure 304 are used as input for registration of the client machine 112 with the server 10.

In one embodiment, selected configuration parameters possessed by the client 112 and the server 110 are updated during this initial communication. The server 110 and client 112 compare mutually held configuration parameters and update parameters that do not match. Selected parameters are selected to be "client dominant" or "server dominant." Client dominant parameters are those configuration parameters in which discrepancies between the parameters of the client 112 and the server 110 are resolved in favor of the client, while discrepancies in the server dominant parameters are resolved in favor of the server. The client dominated parameters may include, but are not limited to, the software installation folder, the client time zone, the job results folder, the index cache folder, the clock skew, and the physical client ID of the virtual machine. The server parameters may include, but are not limited to, the client name and hostname entered by the administrator on the server, the server name, and the patch catch location.

Advantageously, designating certain configuration parameters to be client dominant and server dominant provides the decoupled installation process with significant robustness. These designations are designed to introduce bias into the discrepancy resolution process reflecting that the client dominated parameters are more likely to be correctly recorded in the client than in the server, while the server dominated parameters are more likely to be correctly recorded in the server than in the client. In this manner, the likelihood that the configuration parameters are correctly populated in the client and server is increased.

In another embodiment, selected configuration parameters possessed by the server and client may be verified against one another. In this context, verification refers to a condition that the configuration parameters be the same between the client 112 and the server 110. In one embodiment, the client display name, client hostname, operating system name, hardware ID, other SIM parameters (as discussed above), and installed platforms may be verified parameters.

In the event that the configuration parameters do not match between the client and server, a synchronization failure occurs. As a result, the client machine 112 is not registered for use with the server 110 and, therefore, is not authorized to participate in data storage operations.

Advantageously, this verification process inhibits fraudulent use of the data migration software. In embodiment, configuration parameters, such as the client operating system, may be verified between the client 112 and the server 110 to ensure that the data structure 304 recorded by the client 112 has not been tampered with. For example, tampering may comprise editing the client configuration parameters within the data structure 304 to take advantage of a cheaper license fee offered for one operating system over another. When such tampering is identified during the verification process, synchronization failure occurs and the client 112 is inhibited from joining in data storage operations with the server 110, preventing fraudulent use of the data migration software.

In step 220 of the method 200, the server may further search for a plurality of locally generated globally unique identifiers (GUIDs) on the client machine 112. In general, GUIDs are identifiers used by software applications to provide a reference number that is unique in the context for which it is used. For example, the GUID may be used to represent similar, but not identical, components of the data storage software. If a GUID is present, this parameter will be transmitted back to the server 110 and entered into the server's registry. If no GUID is present, then the server will generate a GUID and update both the server registry as well as its own registry with the GUID.

In further alternative embodiments, the configuration parameters are not discovered by the client 112 but are rather provided to both the client 112 and the server 110. For example, an XML file containing the client configuration parameters may pushed to both the client 112 and the server machines 110 prior to their communication with each other by an third computer which is neither the client or the server. In one embodiment, this third computer comprises an installation server 306.

The installation server is configured to discover both the client 112 and the server 110 machines before they are aware of each other. In one embodiment, this discovery may be enabled by an administrator of the data storage system. For example, the administrator may provide information to the installation server 306 which allows the installation server 304 to discover the client 112 and server 110, such as IP address and port information for the client 112 and server 110. In alternative embodiments, the installation server 306 may become aware of the client 112 and server 110 automatically, through use of listening processes.

The installation server 306 provides the client machine 112 with a data structure 304 containing at least the client configuration parameters and provides the server machine 110 with at least the IP and port information of the client 112 so as to facilitate communication between the client 112 and server 110. In one example, the configuration parameters may be provided in the form of a data structure, such as an XML file. In one example, the XML file may be stored on a portable data medium, such as a CD-ROM or DVD, which may be accessed by the installation server 306. In another embodiment, the XML file may be read from a fixed media source, such as a local or network hard disk drive accessible by the installation server 306. In further embodiments, the XML file may be downloaded by the installation server 306 from an internet storage device, such as a website or ftp server. Once the installation server 306 has provided the client 112 and server 110 with configuration parameters, the client-server communication may take place as discussed above with respect to step 220.

This mechanism of providing the configuration parameters to the client 112 and server 110 is of particular benefit in situations where many clients 112 and/or servers 110 are concurrently configured, such as in a mass-rollout. In this manner, network and machine resources are spared the rigorous self-discovery and configuration population process discussed above, freeing these resources for other tasks, while still providing a substantially automated discovery and configuration process.

Regardless of the mechanism by which the configuration parameters are obtained by the client and server, once the method 200 is complete, the data storage software is installed and the client 112 registered for use with the server 110. Thus, the client 112 and server 110 machines may subsequently communicate with each other as necessary in order to perform data storage operations.

Advantageously, in the decoupled installation of the present disclosure, the provided and/or discovered configuration parameters are substantially the same as those which would be obtained during live installation of the software on the client machine in a conventional installation. Thus, this software design allows the server 110 to register the client 112 for use with the data storage system without significant involvement by the data storage system administrator or, alternatively, a user of the client 112, if they are not the same, enhancing the ease of software installation.

EXAMPLES

In the following examples, circumstances in which decoupled installation may be performed are discussed. In general, the examples illustrate the wide range of software installation situations which may be managed through the use the systems and methods of decoupled installation in computer systems such as data storage systems. The examples further illustrate how the systems and methods of decoupled installation may be utilized by computer professionals to install software more quickly and easily than through conventional software installations. These examples are discussed for illustrative purposes and should not be construed to limit the embodiments of the invention.

Example 1: Server is Unknown to Client

In one embodiment, data storage software possessing decoupled installation capability may be installed on client machines when one or more server configuration parameters are unknown at the time of software installation. There are a variety of scenarios in which a client machine may be deployed before the appropriate server configuration parameters are not known. In one example, the server information may not be known because the server itself has not been deployed. In a further example, the client machine may not be currently configured for, or may not otherwise possess, network access and be unable to communicate with the server.

In a further example, the server parameters may not be known because the client machine has not been assigned to a server. As discussed above, when deployed, a client is assigned to a cell which is managed by a server, such as a storage manager, which instructs the components of the cell, including the client, to perform selected storage operations. The pairing of a selected client with a selected server may be implemented for a variety of reasons, including, but not limited to, geographic location, function of the client, network load balancing. Considerations such as these may be complex and inhibit an administrator from immediately assigning a client to a selected server when installing the data storage software. As a result, the client cannot be deployed until such an assignment is made.

In contrast with conventional software installation methods, the decoupled installation procedures disclosed herein allows the data migration software to be installed, and the client to be deployed in a data migration system, despite the lack of information regarding the server, or communication with the server. In one embodiment, a registration key is entered during installation of the software, the client configuration parameters to be entered by an administrator of the data storage system, or discovered during installation of the software, and recorded in a data structure such as an XML file.

Once the data storage software is installed on the client, the administrator of the data storage system may then configure the server using the configuration parameters. As discussed above, the configuration parameters may be obtained from the client directly, through discovery of the client by the server, through discovery of the server by the client, or from another source. Subsequently, client-server communication may take place, where selected configuration parameters are updated and verified between the client and server to complete the installation process.

In one advantage, the administrator may prepare the client machine in advance of deploying the client, since it is not necessary to specify the server. As a result, the administrator need not be present at the location where the client machine is deployed during installation of the software. For example, an administrator of the data storage system may install the software at a location of their choosing and ship the client machine to the user's location. Once on site, the client and server may discover each other and complete the registration process. Beneficially, this flexibility saves the administrator travel and logistical time in managing the data storage software, reducing the cost of ownership.

In further advantage, the administrator may prepare client machines for contingency purposes in advance of their need. For example, such needs may include replacement of deployed client machines which require removal from service because of failure, required maintenance, or installation of upgrades with pre-imaged machines. Alternatively, prepared clients may be deployed as additional capacity is required within the data storage system. Thus, the ability to prepare clients ahead of time reduces the time required to deploy these machines in service because software installation is already performed, facilitating the deployment process.

Furthermore, the decoupled installation capability makes client machines substantially interchangeable. Because the server parameters are not established during the software installation, the client may be registered with any server within the data storage system, as necessary. Thus, the client configuration parameters of the client already recorded during the software installation do not have to be input or changed when the client is placed into service. This flexibility further saves the administrator significant time when placing client machines into service.

Example 2: Server Configuration

In other examples, decoupled installation may be utilized to facilitate the client registration process. For example, when installing software possessing decoupled installation capability, the configuration parameters are stored for use, at least in part, at the time of installation. As a result, once the software is installed, the administrator of the data storage system merely needs allow the client to auto-generate its configuration parameters and wait for server auto-discovery of the unregistered client. For example, the server may ping selected ports of the unregistered clients, listen for responses, and push server configuration parameters to responding unregistered clients. In this fashion, the server may establish connections with the client machines in order to complete the registration process. Advantageously, the work for the IT professional is minimized because information regarding each client machine does not need to be gathered manually, saving time, resources, and, ultimately, operating costs of the data storage system.

In another aspect, a significant portion of the installation and registration process may be completed without connectivity between the two machines. In one aspect, the configuration parameters may be provided to the server, without communication with the client machine. For example, client machines may be provided in a uniform, "stock" configuration, with the data storage software already installed, as discussed below in Example 3. Thus, the configuration parameters may be known in advance of receipt of the clients, allowing the server to be prepared by the administrator in advance of the receipt of the client. This flexibility again allows IT professionals to strategically deploy their resources, performing as much advance work as possible.

In a further aspect, the decoupled installation may further streamline the client registration process. For example, the administrator may determine the client and server pairings prior to software installation and subsequently deploy the client with software installed. Once the client is provided a communications link with the server, the user may initiate client communication with the server in order to complete registration of the client during the first use of the data storage software. Thus, from the standpoint of the user of the client machine, the registration of the client machine is completed in a nearly automated fashion enhancing the ease of deployment of the client machines.

Example 3: OEM Client Pre-Imaging

In another example, the decoupled installation capability facilitates the production of client machines installed with the data storage software by original equipment manufacturers (OEMs). In one embodiment, an OEM vendor may utilize the pre-image mode on a model or template computer which is representative of a large number of client machines. The services, registry, and binary files may be copied to the model computer, with tools subsequently used to image the disks of the model client. This disk image may then be used to generate a plurality of other clients which are shipped to customers.

In one example, the receiving customer may be the administrator of the data storage system. The administrator may arrange for the client machine to be delivered to a selected site for deployment. Advantageously, then, administrators may have the option to purchase client machines which already have the data storage software installed. In one aspect, this option may cost significantly less than it would to install the software. Furthermore, it saves the IT professional the time required to install the software. Further, these benefits are compounded as the number of client machines is increased.

This software design is also of benefit to the small business consumer. In another aspect, a small business owner may arrange to have an outside contractor administer their data storage system. The ability to purchase a client machine having pre-installed data storage software which may be registered substantially automatically with a server allows the small business owner to quickly deploy client computers without the need for an on-site IT professional. Thus, decoupled installation of the data storage software allows the small business owner to implement a data storage system at a lower cost than would otherwise be possible.

Furthermore, in certain embodiments, the systems and methods described herein can advantageously be implemented using computer software, hardware, firmware, or any combination of software, hardware and firmware. In certain embodiments, systems are implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of decoupled installation of data storage software, comprising:
   monitoring, with a storage manager comprising computer hardware having one or more computer processors, primary data created by different software applications executing on at least first and second client computers, the first and second client computers in communication with the storage manager via a network;
   installing data storage software on a third client computer while the third client computer that is decoupled from the network and prior to communication between the third client computer and the storage manager,
      wherein the installation of the data storage software stores a plurality of client computer configuration parameters associated with the third client computer, wherein the client computer configuration parameters comprise at least virtual data connection information used by programs to exchange information;
   subsequent to said installing, coupling the third client computer to the network and listening to network traffic on the network with the third client computer to determine whether the storage manager is available via the network;
   subsequent to said coupling the third client computer to the network: communicating from the third client computer to the storage manager at least the client configuration parameters;
   comparing at the storage manager, the client computer configuration parameters stored by the third client computer with the one or more storage manager configuration parameters associated with the storage manager, wherein one or more configuration parameters are designated as client dominant parameters based on the one or more parameters being more likely to be correctly recorded in the client than in the server, and the other configuration parameters are designated as server dominant parameters based on the other parameters being more likely to be correctly recorded in the server than in the client, and when discrepancies exist:
      using the virtual data connection information to establish a virtual data connection between the storage manager and the data storage software installed on the third client computer, such that the storage manager and the data storage software exchange information directly;
      for discrepancies involving the client dominant parameters, using the corresponding client computer configuration parameters in conjunction with data storage operations involving the storage manager and the third client computing device; and
      for discrepancies involving the server dominant parameters, using the corresponding storage manager configuration parameters in conjunction with data storage operations involving the storage manager and the third client computing device.

2. The method of claim 1, wherein the storage manager communicates with a secondary data storage system capable of performing data storage operations.

3. The method of claim 2, wherein the data storage operations comprise at least one of storage resource management operations and hierarchical storage management operations.

4. The method of claim 2, wherein the third client computer comprises at least one of a client and a management component which provides instructions to transmit data to or from a client and a plurality of storage devices.

5. The method of claim 1, wherein the client computer configuration parameters installed while the third client computer is decoupled from the network comprise at least one of a client computer display name, an operating system of the client computer, a plurality of hardware identifiers, a plurality of software information management (SIM) parameters, a plurality of platforms installed on the client computer, a plurality of selected folders, a client computer time zone, a designation of physical or virtual machine status, an original equipment manufacturer (OEM) identifier, a globally unique identifier (GUID), a server hostname, and a clock skew.

6. The method of claim 1, wherein at least a portion of the client computer configuration parameters installed while the third client computer is decoupled from the network are supplied by a software installation application.

7. The method of claim 1, wherein the storage manager automatically discovers the third client computer after the third client computer has been coupled to the network.

8. A system for decoupled installation of data storage software, comprising:
- a storage manager comprising computer hardware having one or more computer processors, the storage manager configured to monitor primary data created by different software applications executing on at least first and second client computers, the first and second client computers in communication with the storage manager via a network;
- a third client computer possessing installed data storage software,
    - wherein installation of the data storage software on the third client was while the third client computer was decoupled from the network and prior to communication between the third client computer and the storage manager,
    - wherein the installation of the data storage software stores a plurality of client computer configuration parameters associated with the third client computer, wherein the client computer configuration parameters comprise at least virtual data connection information used by programs to exchange information directly,
    - wherein after the third client computer is coupled to the network, the third client computer is configured to listen to network traffic on the network to determine whether the storage manager is available via the network,
    - wherein the third client computer is configured to send to the storage manager, at least a portion of the client computer configuration parameters; and
    - wherein the storage manager is configured to compare the client computer configuration parameters from the third client computer with the one or more storage manager configuration parameters, wherein one or more configuration parameters are designated as client dominant parameters based on the one or more parameters being more likely to be correctly recorded in the client than in the server, and the other configuration parameters are designated as server dominant parameters based on the other parameters being more likely to be correctly recorded in the server than in the client, and when discrepancies exist:
        - use the virtual data connection information to establish a virtual data connection between the storage manager and the data storage software installed on the third client computer, such that the storage manager and the data storage software exchange information directly;
        - for discrepancies involving the client dominant parameters, using the corresponding client computer configuration parameters in conjunction with data storage operations involving the storage manager and the third client computing device; and
        - for discrepancies involving the server dominant parameters, using the corresponding storage manager configuration parameters in conjunction with data storage operations involving the storage manager and the third client computing device.

9. The system of claim 8, wherein the storage manager communicates with a secondary data storage system capable of performing data storage operations.

10. The system of claim 9, wherein the data storage operations comprise at least one of storage resource management operations and hierarchical storage management operations.

11. The system of claim 8, wherein the third client computer comprises at least one of a client and a management component which provides instructions to transmit data to or from a client and a plurality of storage devices.

12. The system of claim 8, wherein the client computer configuration parameters installed while the third client computer is decoupled from the network comprise at least one of a client computer display name, an operating system of the client computer, a plurality of hardware identifiers, a plurality of software information management (SIM) parameters, a plurality of platforms installed on the client computer, a plurality of selected folders, a client computer time zone, a designation of physical or virtual machine status, an original equipment manufacturer (OEM) identifier, a globally unique identifier (GUID), a server hostname, and a clock skew.

13. The system of claim 8, wherein at least a portion of the client computer configuration parameters installed while the third client computer is decoupled from the network are provided to the third client computer from a software installation application.

14. The system of claim 8, wherein the third client computer communicates with the storage manager via a predefined port.

15. The system of claim 8, wherein the third client computer provides to the storage manager port information associated with the third client computer.

16. The system of claim 8, wherein the storage manager automatically discovers the third client computer after the third client computer has been coupled to the network.

* * * * *